June 16, 1953 P. P. REICHERTZ 2,641,924
DETERMINATION OF EFFECTIVE POROSITY OF CORE SAMPLES
Filed Sept. 11, 1947 3 Sheets-Sheet 2

INVENTOR.
Paul P. Reichertz
BY
Sidney A. Johnson
ATTORNEY

Patented June 16, 1953

2,641,924

UNITED STATES PATENT OFFICE 2,641,924

DETERMINATION OF EFFECTIVE POROSITY OF CORE SAMPLES

Paul P. Reichertz, Dallas, Tex., assignor, by mesne assignments, to Socony-Vacuum Oil Company, Incorporated, New York, N. Y., a corporation of New York Application September 11, 1947, Serial No. 773,409

4 Claims. (Cl. 73—38)

The determination of the total pore volume of core samples is a routine measurement and is carried out, for example, to aid in the evaluation of the total potential production of an oil or gas well and/or of an oil or gas reservoir from similar measurements from a plurality of wells in a field. For example, a method suitable for the determination of total porosity is shown in U. S. Patent 2,345,535. Knowing the total pore volume, and the oil, gas and water ratio in the core sample, the total oil volume per unit reservoir volume may theoretically be determined. As a practical matter the actual recovery from a reservoir, as is well known, is but a varying percentage of the total. One factor influencing the percentage oil recovery is the relative pore size, since obviously oil flow will be more readily effected under the available pressure differentials from and through the larger pores. It is highly desirable therefore to be able to determine not only the total pore volume but also the relative pore size distribution.

Knowledge of the pore size distribution is also desirable for field operations which require the selective plugging of high permeability streaks in reservoir sands. For such operations a knowledge of capillary size distribution permits an estimate to be made of the particle size of the plugging agent which will result in most efficient sealing action. For these and other reasons, knowledge of the relative pore size distribution within the core represents highly desirable information.

It has been pointed out that surface tension of any liquid having a contact angle of greater than 90° opposes the entrance of such liquid into a small pore, and that the pressure differential ($p$) required to force liquid into a pore of given size equals $$\frac{-2\sigma \cos \theta}{r}$$

(assuming a pore of circular cross section), where sigma is the surface tension, theta is the contact angle and $r$ is the pore radius (cf. E. W. Washburn and E. N. Bunting, J. Am. Ceram. Soc. 5, 48 (1922)). Since $\theta$ is greater than 90°, the term $$\frac{-2\sigma \cos \theta}{r}$$

is intrinsically positive. From this relation it appears that a porous core under zero pressure will not absorb any of a nonwetting liquid in which it is immersed. When the pressure is raised to some finite value, the liquid will penetrate and fill all pores having radii equal to or greater than that calculated from the above relationship. As the pressure is increased, the amount of liquid "absorbed" increases monotonically at a rate proportional to the differential pore volume due to pores of a size corresponding to the instantaneous pressure.

Essentially, the pore size distribution of a core is determined in accordance with the invention by immersing the core in a body of a nonwetting liquid such as mercury at substantially zero pressure absolute, gradually and progressively increasing the pressure and measuring the decrease in volume of liquid surrounding the core from which value the increase in the amount of liquid absorbed by each increment of pressure may be determined. Since theta and sigma are determinable quantities for any liquid at any specific temperature, the pore volume which is filled by the pressure increment between any two pressure readings may be determined. Therefore the total volume of pore space for any range of pore size openings may be determined. The principle of the invention applies to pore sizes down to a value where the pores are no longer large compared to the atomic dimensions of the liquid, i. e., well below 100 angstroms in radius which is far below the range of interest. For practical purposes it is not necessary to calculate the pore volume corresponding to each increment of pore size in angstroms. A determination of the volume absorbed versus the pressure applied gives adequate information for a comparison of the relative pore size distribution in various cores. From this, the distribution function may be determined and for convenience this distribution function may be plotted against the pore size.

The usual range of interest is over a pressure range of from about 0.5 pound per square inch to about 2000 pounds per square inch absolute (about 3 to 10,000 centimeters of mercury). This range gives information for the pore size distribution of pores having radii of from about 500 to 2,000,000 angstroms, which represents the field of interest in connection with the flow of oil or gas, so that higher pressures are not necessary. Pressures much below 0.5 pound are impractical since the core must be immersed below the liquid surface.

The method of determining the pore size distribution in a core may be better understood from the description of the specific apparatus, which I have found to be a particularly suitable embodiment for carrying out the invention, in connection with the drawings in which.

Figure 2:
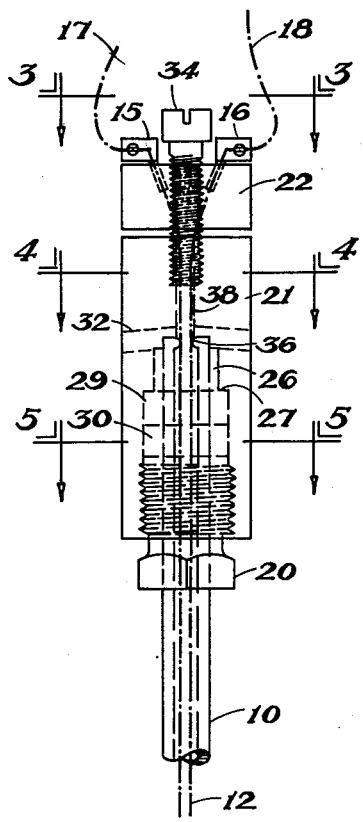
Figure 2 is an enlarged vertical section showing in greater detail the end of the capillary tube through which the leads to the measurement loop extend, the surrounding cap and the lead plug with the vacuum jacket removed.
Figure 3:
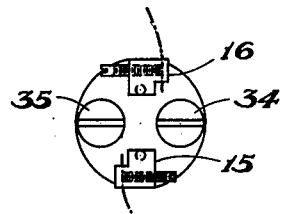
Figure 3 is a top plan view of the lead plug looking from the left of Figure 2.
Figure 4:
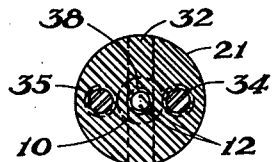
Figure 5:
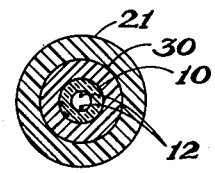
Figure 6:
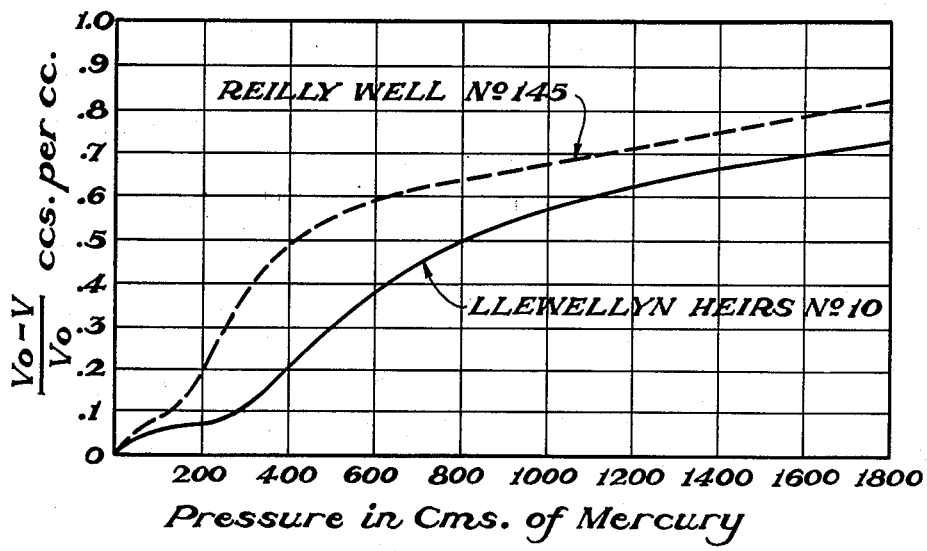
Figure 7:
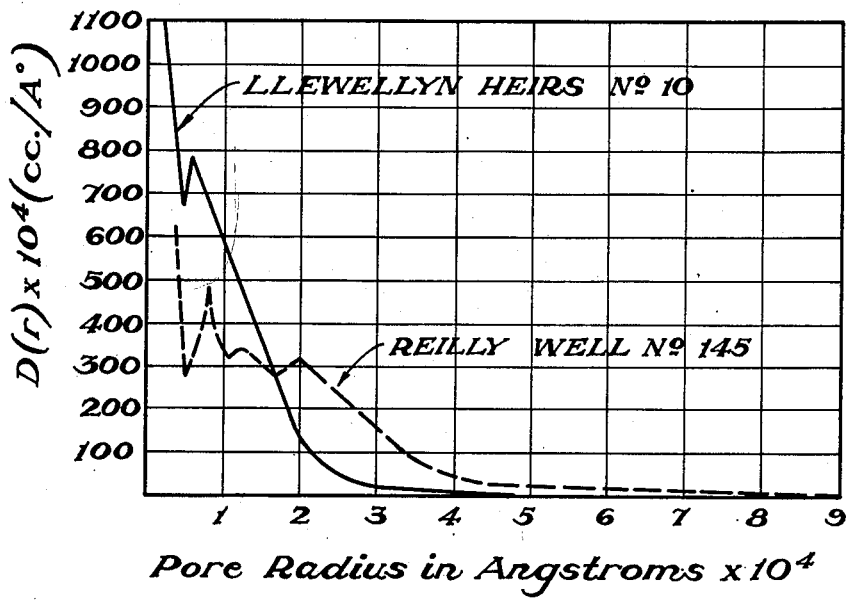

Figures 4 and 5 are sectional views, rotated 90° counterclockwise to correspond with Figure 3, taken along the lines 4—4 and 5—5, respectively, of Figure 2;

Figure 6 is a graph showing the change in the volume of liquid mercury absorbed with change in pressure for two typical cores; and Figure 7 is a graph showing the variation in the distribution function with variation in pore size for the same cores as shown in Figure 6.

Figure 1:
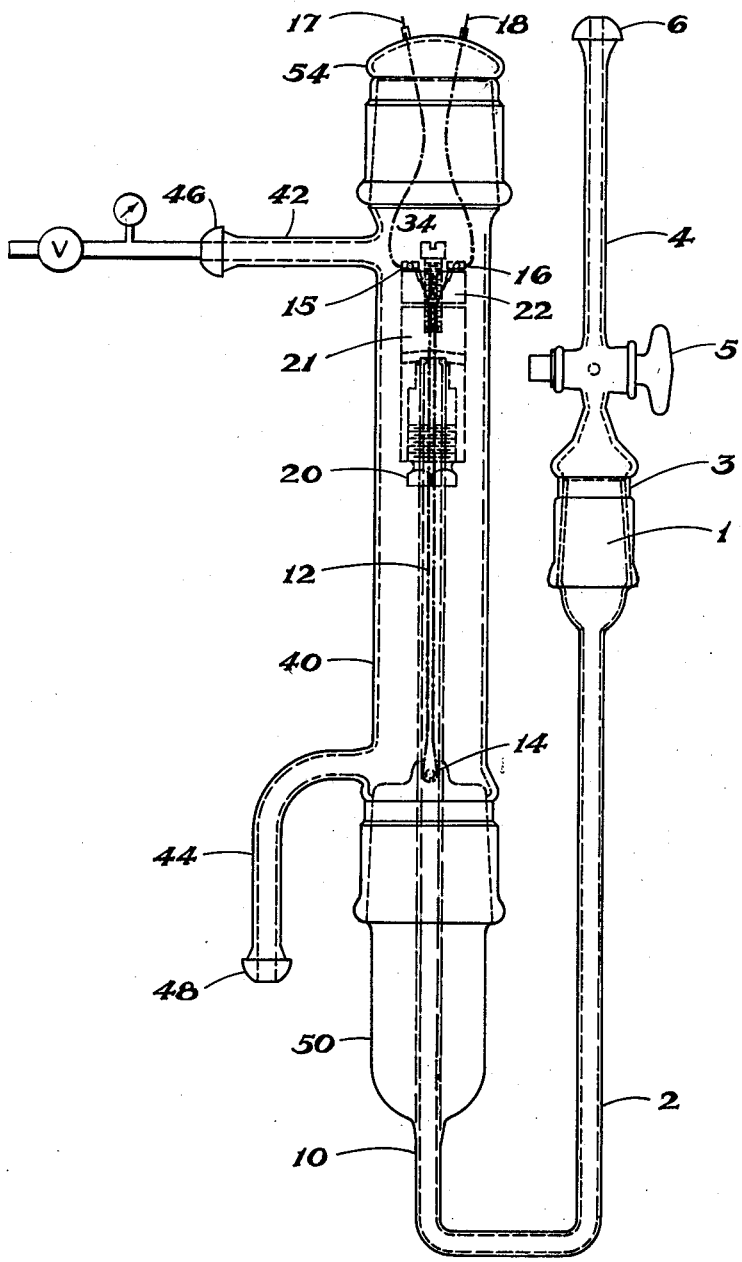
Figure 1 represents a side cross sectional view of the apparatus as set up for initial filling with mercury and for operation for that portion of the pressure range where pressures not greater than atmospheric are employed.

Referring to Figure 1 of the drawing, the enlarged core sample holder 1 open at its upper end is integral with one leg of the capillary U tube 2. The apparatus is preferably constructed of glass, although other materials of construction could be used. Over the core sample holder 1 is fitted the cap 3 in fluid tight connection, the outer edge of sample holder 1 and the inner surface of cap 3 being ground to assure a smooth connection. To the open upper end of cap 3 is attached the tubing 4 provided with stopcock 5 and end fitting 6. In order to measure the height of liquid in leg 10 of U tube 2, loop 12 of platinum resistance wire is inserted therein and secured at its lower end over rod 14 secured to the side walls of the leg 12. The free ends of the loop 12 are connected to terminals 15 and 16, as more fully described hereinafter, to which are fastened suitable leads 17 and 18 to provide means for measuring the resistance across loop 12.

To the upper end of leg 10, shown in detail in Figure 2, is fastened the fitting 20 which is provided with an externally threaded upper end serving as a seat for cap 21 which in turn serves as a support for plug member 22 to which terminals 15 and 16 are affixed. Cap 21 is hollow at one end and is internally threaded to fit over member 20. The hollow end is provided with a necked-down portion 26 providing shoulder 27. Rubber washers 29 and 30 are slightly compressed by shoulder 27 and serve to provide resiliency in the support for the member 21 protecting the end of the capillary leg 10. Holes 32 (see also Figure 4) are drilled through the member 21 at approximately the level of the end of capillary 10 and serve to provide access to the open end of the capillary. Plug 22 is secured to cap 21 by screws 34 and 35 (see also Figures 3 and 4) which fit into suitable threaded holes in the cap. Fitting 20, cap 21 and plug member 22 may all be made of a suitable synthetic resin such as a polymerized methacrylate ester resin. A lip 36 is provided around the inner wall of the end of the capillary to keep the loop 12 suitably spaced from the walls of the capillary. Substantially uniform spacing between the wires and the walls of the capillary over the mercury filled portion of the capillary is desirable to avoid the possibility of trapping any mercury as the level of the mercury is lowered.

The free ends of the loop 12 after leaving the capillary leg 10 pass through hole 38 in the upper end of the cap 21 to the plug. The ends of the loop are passed through holes in the resinous plug and are connected at their free ends to the terminals 15 and 16. Terminals 15 and 16, shown in detail in Figures 2 and 3, may then have connected to them the leads 17 and 18 which are in turn connected to a source of electric current and a suitably accurate current measuring device as a sensitive galvanometer (neither shown) for determining the resistance between the terminals 15 and 16. Screws 34 and 35 may be adjusted to make loop 12 taut.

In filling the apparatus with mercury and for the initial readings, for the reasons hereinafter pointed out, a vacuum jacket 40 is placed around leg 10, cap 21 and plug 22. This jacket 40 is provided with tubular connections 42 and 44, the ends 46 and 48 of which are provided with suitable end fittings. The lower end of hollow jacket 40 is fitted in air tight relation over a suitable seat 50 secured around capillary tube 10. Again a ground glass joint between jacket 40 and seat 50 is satisfactory. In order that the leads 17 and 18 may conveniently be connected to the terminals 15 and 16 the upper end of the vacuum jacket 40 is preferably open and a cap 54, fitted to the upper end of the jacket and through which the leads extend, is placed over the upper end of the jacket.

In operation, after the core is placed in sample holder 1 the jacket 40 is placed over the capillary leg 10 on seat 50. Leads 17 and 18 are then connected to terminals 15 and 16 and lead to suitable power supply and current measuring apparatus. The cap 54 is then placed over jacket 40. Fittings 6 and 46 are connected to a suitable vacuum pump (not shown). Fitting 48 is connected to a supply of liquid mercury (also not shown). Stopcock 5 is turned to the open position. The mercury supply is shut off. The vacuum pump is started and the entire system evacuated to a suitably low pressure, such as 5 microns. The mercury line is then opened and, due to the vacuum, mercury will flow into the jacket 40 to a level covering the holes 32. The liquid mercury will flow in through the holes 32 filling the capillary tube 2. As soon as the level of the liquid mercury passes above the stopcock 5 this stopcock is turned to a closed position, trapping the mercury in the core sample holder and the U tube. The mercury holder is then lowered, allowing the mercury in the jacket outside the U tube to flow out from the system. The line leading to the mercury supply is then closed.

The apparatus is then in readiness to begin taking readings with the core surrounded by liquid mercury at substantially zero pressure. The vacuum pump is disconnected and air at a progressively increasing pressure up to atmospheric allowed to enter through tube 42 through a suitable valve and pressure gauge, diagrammatically shown in Figure 1, so that the pressure within the system is known. As each increment of air is allowed to enter, a reading of the resistance offered by loop 12 to the flow of current between terminals 15 and 16 is made. As the pressure rises, mercury is forced into the pores of the core. This in turn lowers the liquid level of the mercury and exposes a greater length of the loop 12 above the level of the liquid mercury which acts to short out the remainder of the loop. By suitable calibration of the instrument, the volume change corresponding to a given change in resistance is determined. When the pressure within the jacket 40 has been allowed to build up to atmospheric, the connections to fittings 46 and 48 are removed, the cap 54 and jacket 40 taken off, and the entire instrument placed within a suitable bomb. The bomb is provided with insulated connections whereby the leads may be connected to terminals 15 and 16 and led out through the wall of the bomb to permit resistance determinations as before. The bomb is then connected to a suitable pressuring system such as a nitrogen gas cylinder and the pressure within the bomb allowed to build up in increments to a value of about 2,000 pounds per square inch. Readings of the resistance change for each increment of pressure are made as before.

In making the readings of the resistance change, a sufficient time interval should be allowed after each increment of pressure change to allow the resistance to come to equilibrium indicating that the pores having a radius equal to or larger than that indicated by the relationship given above have been filled. Furthermore, since temperature change would obviously have a substantial effect upon the volume of the liquid used in the instrument, the apparatus should be protected from any substantial temperature change during the course of a measurement.

Having described a method of carrying out the invention, the manner in which the values obtained therefrom may be used to determine the pore size distribution is readily apparent from the following relationships. As pointed out above, $$p = \frac{-2\sigma \cos \theta}{r} \qquad (1)$$

By measurement, the angle theta may be determined, although from a series of tests with typical core materials 140° has been found to be generally the actual value within ±5° and may be used for all cases, especially since comparative rather than absolute values are the practical purpose of the invention. Similarly, sigma may be taken as 486 dynes per centimeter. Hence, $$r = \frac{55 \times 10^{-3} \text{ cm.}}{p (\text{cm. of mercury})} \qquad (2)$$

From the observed values, resistance change, from which volume change may be determined, and $p$ in centimeters of mercury are determined. Therefore from the experimental observations a curve (pressuring curve) showing the variation in volume absorbed with change in the applied pressure may be made up.

The total volume of all pores having a radius between $r$ and $r + dr$ may be expressed as $$dV = D(r) dr \qquad (3)$$

where $D(r)$ is the distribution function for pore size. Since sigma and theta are constant, from Equations 1 and 3, $$dV = -D(r) \frac{r}{p} dp \qquad (4)$$

The volume measured is the pore volume of all pores whose openings have a radius equal to or greater than $r$, (the total pore volume) $V_0$ decreased by the volume $V$, of pores smaller than $r$. Since $$\frac{d(V_0 - V)}{dp} = \frac{-dV}{dp}$$

and since the slope $$\frac{-dV}{dp}$$

is a determinable quantity from the pressuring curve, the relationship between $D(r)$ and $r$ may be readily plotted, as is evident by rewriting Equation 4 to read $$D(r) = -\frac{p}{r} \frac{d(V_0 - V)}{dp} \qquad (5)$$

For any desired number of values of $p$, the slope may be graphically determined and the values for $D(r)$ determined from Equation 5. The values for $r$ may be determined from Equation 2, corresponding to the values for $D(r)$ and the distribution in cubic centimeters per angstrom plotted against the pore radius in angstroms. The area under the curve between any two values for the radius will of course give the volume in cubic centimeters of the total pores having radii over the size range selected. A graphical presentation of the variation in the distribution function with pore size is usually adequate. Known instruments may be used for routine investigation to directly translate the pressuring curve to the distribution curve without requiring a graphical solution of the slope at a plurality of points.

Typical pressuring and distribution curves for two cores, one obtained from Well No. 145 Reilly, Wichita County, Texas, at a depth of 1340 feet, and the second from Llewellyn Heirs No. 10, Archer County, Texas, at a depth of 1420 feet, are shown in Figures 6 and 7 respectively.

Although I have shown a specific apparatus and mode of operation for carrying out the method of the invention, it will be readily apparent to those skilled in the art that many modifications in the details and techniques thereof may be employed. The invention should therefore not be construed as limited except as indicated in the appended claims.

I claim:

1. The method of evaluating the porosity of an earth core sample which comprises placing the core sample in a closed chamber, evacuating the chamber, placing a body of liquid mercury in the chamber in such a manner that the mercury envelops the core sample, subjecting the body of mercury to a stepwise series of incremental increases of pressure, after each of said increments of pressure increase measuring the decrease in volume of the body of liquid mercury in contact with the core effected by the entrance of mercury into the pores of the core whereby the relative amount of pores of a plurality of size ranges in the core sample may be determined.

2. The method of evaluating the properties of an earth core sample which comprises placing the core sample in a closed chamber, evacuating the chamber, placing a body of liquid mercury in the chamber in such a manner that the mercury envelops the exposed surface of the core sample, subjecting the body of mercury to a step-wise series of incremental increases of pressure, after each of said increments of pressure increase measuring the change in volume of the body of liquid mercury in contact with the core to determine the volume of mercury entering the pores of the core under the influence of each increment of pressure increase.

3. The method of claim 2 wherein at least one increment of pressure increase is between two subatmospheric pressures and at least one increment of pressure increase is between two pressures greater than atmospheric.

4. The method of evaluating the porosity of an earth core sample which comprises placing the core sample in a closed chamber, evacuating the chamber, placing a body of liquid mercury in the chamber in such a manner that the mercury completely surrounds the core sample and covers the upper surface thereof to a depth not greater than about 3 centimeters, then subjecting the body of mercury to a higher subatmospheric pressure, allowing the system to attain equilibrium, measuring the decrease in volume of the body of liquid mercury surrounding the core to determine the volume of mercury entering the pores of the core under the influence of the pressure increase increment, again subjecting the body of mercury to a still higher pressure, allowing the system to attain equilibrium, and again measuring the decrease in volume of the body of liquid mercury surrounding the core to determine the volume of murcury entering the pores of the core under the influence of the second increment of pressure increase.

PAUL P. REICHERTZ.

References Cited in the file of this patent

UNITED STATES PATENTS

| Number | Name | Date |
| --- | --- | --- |
| 1,172,650 | Walton | Feb. 22, 1916 |
| 2,293,488 | Bays | Aug. 18, 1942 |
| 2,296,852 | Horner | Sept. 29, 1942 |
| 2,345,535 | Horner | Mar. 28, 1944 |
| 2,371,270 | Smith | Mar. 13, 1945 |

FOREIGN PATENTS

| Number | Country | Date |
| --- | --- | --- |
| 403,304 | Germany | Sept. 29, 1924 |